US008666030B2

(12) United States Patent
Shepher

(10) Patent No.: US 8,666,030 B2
(45) Date of Patent: Mar. 4, 2014

(54) VOICE AND VIDEO OVER A SHARED TELEPHONE LINE

(76) Inventor: Ofer Shepher, Encino, CA (US)

( * ) Notice: Subject to any disclaimer, the term of this patent is extended or adjusted under 35 U.S.C. 154(b) by 1617 days.

(21) Appl. No.: 12/181,555

(22) Filed: Jul. 29, 2008

(65) Prior Publication Data

US 2009/0009583 A1      Jan. 8, 2009

Related U.S. Application Data

(60) Provisional application No. 60/952,693, filed on Jul. 30, 2007.

(51) Int. Cl.
*H04M 11/00*      (2006.01)

(52) U.S. Cl.
USPC .......................................... 379/45; 348/14.01

(58) Field of Classification Search
USPC ............. 379/33, 36–48; 455/228, 404, 404.1; 348/14.01
See application file for complete search history.

(56) References Cited

U.S. PATENT DOCUMENTS

| | | | |
|---|---|---|---|
| 3,883,695 A * | 5/1975 | Bickel et al. ..................... | 379/40 |
| 4,485,400 A | 11/1984 | Lemelson et al. | |
| 4,511,886 A | 4/1985 | Rodriguez | |
| 4,715,059 A | 12/1987 | Cooper-Hart et al. | |
| 4,932,047 A | 6/1990 | Emmons et al. | |
| 5,164,980 A * | 11/1992 | Bush et al. ................ | 348/14.13 |
| 5,365,577 A * | 11/1994 | Davis et al. ................ | 379/93.17 |
| 5,790,019 A * | 8/1998 | Edwin ........................... | 340/506 |
| 6,307,920 B1 * | 10/2001 | Thomson et al. ............... | 379/45 |
| 6,380,967 B1 | 4/2002 | Sacca | |
| 2004/0086091 A1 * | 5/2004 | Naidoo et al. .................. | 379/37 |
| 2005/0033120 A1 * | 2/2005 | Cohen ........................... | 600/300 |
| 2005/0243806 A1 * | 11/2005 | Sakano et al. ................ | 370/352 |

OTHER PUBLICATIONS

Product Information—Linear Personal Emergency Reporting System Model No. PERS-3600; printed from http://www.linearcorp.com/product.asp?product=SSC00066; dated Jun. 19, 2007; 2 pages.
Linear PERS-3600 Emergency Reporting System Specifications; printed from http://www.linear-pers.com/pers3600-specs.html; dated Jun. 26, 2007; 2 pages.
OzLine 4CS Remote Video Digital Dialer for Central Station Services Specification; OzVision; 1 page.

* cited by examiner

*Primary Examiner* — Fan Tsang
*Assistant Examiner* — Akelaw Teshale
(74) *Attorney, Agent, or Firm* — Panitch Schwarze Belisario & Nadel LLP

(57) ABSTRACT

A system for alternately transmitting an audio signal and a video signal over a single voice grade telephone line is disclosed. The system includes an apparatus located at a subscriber location which establishes a first communication connection between a user at the subscriber location and a dispatcher at a dispatch station, over which first communication connection transmission of voice signals are enabled to be simultaneously transmitted between the subscriber's premise and the dispatcher, and which disestablishes the first communication connection and establishes a second communication connection over which a continuous video signal is transmitted from the subscriber location to the dispatcher.

14 Claims, 1 Drawing Sheet

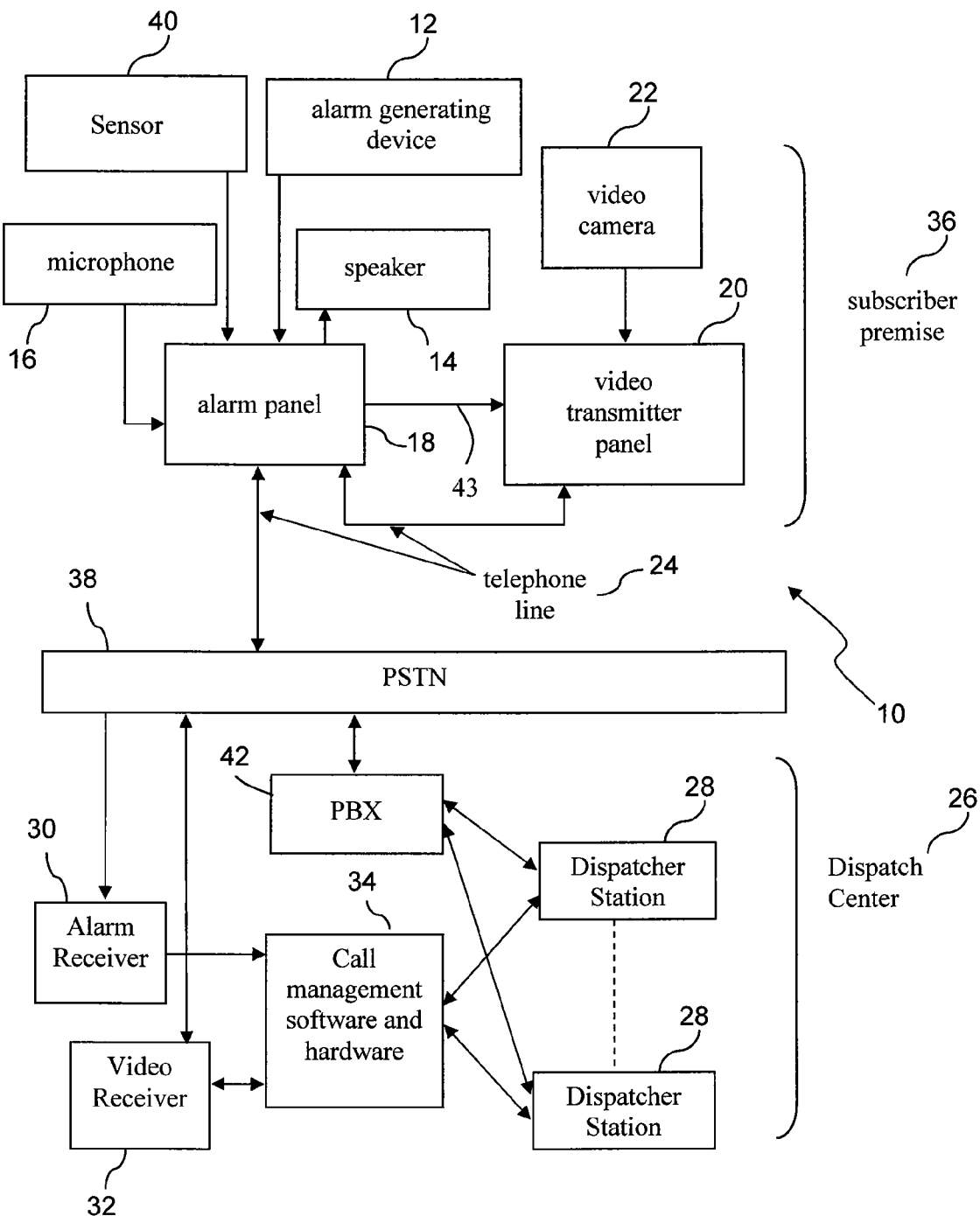

VOICE AND VIDEO OVER A SHARED TELEPHONE LINE

CROSS-REFERENCE TO RELATED APPLICATIONS

This application claims the benefit of U.S. Provisional Patent Application No. 60/952,693 filed Jul. 30, 2007 entitled "Voice and Video over a Shared Telephone Line".

BACKGROUND OF THE INVENTION

Typical personal emergency response systems (PERS) employ a portable alarm unit worn by a subscriber. The alarm unit (typically a pendant), when actuated by the subscriber, transmits a wireless alarm signal to a fixed base station located within the subscriber's premise. When the base station receives the alarm signal, the base system transmits an alert signal via a telephonic communication link to a central dispatch center. A dispatcher at the central dispatch center attempts to verify the alert via two-way voice communications with the subscriber via the base station, which typically has a speaker phone capability. Depending upon information or lack thereof received by the dispatcher from the subscriber, directions may then be issued by the dispatcher to dispatch aid to the residence from which the alert signal was received. PERS of this type have proven to be a reasonably effective tool for responding to the needs of elderly and/or infirm persons confined to their residences and/or persons living alone.

The typical subscriber who uses a PERS subscribes to only a single voice grade telephone line corresponding to a single telephone number. That is, the PERS subscriber's telephone line has not been configured by the telephone service provider to support a bandwidth greater than the standard voice grade bandwidth of 400 to 3400 Hz.

There may be occasions where the subscriber of a PERS (or another person at the subscriber's premise) having access to only a single voice grade subscriber telephone line wishes to transmit a continuous video signal, and not merely a single freeze frame image, to the central dispatch center in addition to having two-way voice communication with the central dispatch center in order that the person's physical condition may be more properly assessed by the dispatcher. Accordingly, it would be desirable to be able to send a continuous video signal from the subscriber's location to the central dispatch center over the same subscriber voice grade telephone line that is being used for two-way voice communication.

SUMMARY OF THE INVENTION

The present invention comprises a system for alternately transmitting audio and video over a single voice grade telephone line. The system comprises an apparatus located at a subscriber location which establishes a first communication connection between a user at the subscriber location and a dispatcher at a dispatch station, wherein transmission of voice signals are enabled to be simultaneously transmitted between the subscriber's premise and the dispatcher; and which disestablishes the first communication connection and establishes a second communication connection wherein a continuous video signal is transmitted from the subscriber location to the dispatcher.

Another aspect of the present invention comprises a method of alternately transmitting voice and continuous video signals over a single voice grade telephone line. The method comprises the steps of: establishing a first communication connection between a user at a subscriber location and a dispatcher at a dispatch station wherein transmission of voice signals are enabled to be simultaneously transmitted between the subscriber location and the dispatcher; and disestablishing the first communication connection and establishing a second communication connection wherein a continuous video signal is enabled to be transmitted from the subscriber location to the dispatcher.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 is a block diagram of a system for transmitting voice and video signals over a telephone line.

DETAILED DESCRIPTION OF THE INVENTION

Referring now to FIG. 1 there is shown a preferred embodiment of a system 10 in which the telephone line 24 at a premise 36 of a subscriber of a personal response system (PERS) is a single standard plain old telephone system/public switched telephone system (POTS/PSTN) 38 analog voice grade telephone phone line assigned a single telephone number and having a bandwidth of approximately 400-3400 Hz. for transmitting both voice and video signals between the subscriber's premise 36 and a dispatch center 26.

At a subscriber's premise 36 the preferred embodiment of the system 10 includes an alarm panel 18, preferably based on the PERS3600 manufactured by Linear LLC. However, the alarm panel may be manufactured by others than Linear LLC. The alarm panel 18 includes a receiver for detecting an alarm signal originating from a user actuated alarm generating device 12 such as a pendant. Preferably, the alarm signal is wireless but may be wired. The alarm panel 18 also includes a microphone 16 for receiving sound waves and a loudspeaker 14 for generating sound waves. The alarm panel 18 may also receive other types of alarm signals from one or more sensors 40. An example of a signal generated by the sensor 40 may be a signal caused by detecting a fire. Such signals may be wireless or wired signals. The alarm panel 18 is connected by any suitable means to the public switched telephone network (PSTN) 38 via the single voice grade telephone line 24. The alarm panel 18 provides an alert signal which includes an account number, the type of the alarm signal and the alarm zone identification. The alarm panel 18 also transmits and receives voice signals and optionally transmits video signals (see below).

Also located at the subscriber's premise 36 is a video transmitter panel 20. A video camera 22 is connected to the video transmitter panel 20. Preferably the video camera 22 is wirelessly connected to the video transmitter panel 20 but alternatively, may be wired. In the preferred embodiment, the video transmitter panel 20 is based on a model 2CS video unit manufactured by OzVision. However the video panel could be manufactured by other than OzVision. The video transmitter panel 20 provides continuous video during the time interval that the video transmitter panel 20 is in communication with the dispatch center 26 (see below). Preferably the continuous video is provided at a rate of four frames per second at a resolution of 320/240 lines per frame. However the frame rates may be selected to be between one frame per second and 30 frames per second and the resolution may be selected to be between 160/120 and 640/480 lines per frame. The output of the video transmitter panel 20 is daisy chained to the telephone line 24 through the alarm panel 18. A trigger connection 43 (described below) is also provided between the alarm panel 18 and the video transmitter panel 20.

The system 10 also includes a dispatch center 26 remote from the subscriber's premise 36 and connected to the subscriber's premise 36 via the PSTN 38. The dispatch center 26 includes an alarm receiver 30 which decodes the alert from the alarm panel 18. The dispatch center 26 also includes a video receiver 32 which receives the video signal from the video transmitter panel 20 and which decodes the video signal. A private branch exchange (PBX) 42 routes calls originating at the subscriber premises 36 to dispatcher stations 28. A call management subsystem 34 routes the output of the alarm receiver 30 and the video receiver 32 to the dispatcher station 28 which has been assigned the corresponding subscriber call. Each dispatcher station 28 includes means for verbally communicating with a user and a video display for displaying the output of the video transmitter panel 20. The PBX 42, call management subsystem 34 and the dispatcher station 28 are of conventional design except as described and therefore are not described in detail herein for sake of brevity.

Processing of a call from a subscriber premise 36 by the system 10 is initiated by the alarm generating device 12 or the sensor 40 generating an alarm signal. The alarm signal is received by the alarm panel 18 which is connected to the subscriber's telephone line. The alarm panel 18 goes off-hook having received the alarm signal and calls the alarm receiver 30 at the dispatch center 26 using a telephone number associated with the alarm receiver 30 which is stored in the alarm panel 18. Upon a connection being made to the alarm receiver 30, the alarm panel 18 transmits the account identifier associated with the subscriber, the type of the alarm and the alarm zone identification to the dispatch center 26. The call is decoded by the alarm receiver 30 at the dispatch center 26 for the account identifier associated with the user and the alarm information and the call is routed by the call management system 34 to the dispatcher station 28 to which the voice call has been routed by the PBX.

Upon receipt of the call at the dispatcher station 28, a dispatcher at the dispatcher station 28 initiates two-way voice communication with the user via the telephone line 24, the alarm panel 18, the speaker 14 and the microphone 16. The user may request the dispatcher by voice that video originating from the video camera 22 be transmitted to the dispatcher. The dispatcher may initiate the video transmission in response to the request, or upon the dispatcher's own initiative. The video transmission request originating at the dispatch station 28 causes an in-band DTMF signaling command to be generated by the PBX 42 which is transmitted over the telephone circuit to the subscriber's alarm panel 18. The alarm panel 18 receives and decodes the DTMF signaling command and initiates the following preferred sequence of events:
 1. The alarm panel 18 signals the video transmitter panel 20 via the trigger connection 43 to begin monitoring the status of the single phone line 24 on which to send video from the video camera 22;
 2. The alarm panel 18 sets an internal call-back timer and a line status monitoring circuit for the purpose re-establishing two-way voice communication with the user after the video transmitter panel 20 is done sending video;
 3. The alarm panel 18 goes on-hook followed by the dispatch center 26 going on-hook. The video transmitter panel 20 detects the on-hook status of the telephone line 24 and calls the video receiver 32 at the dispatch center 26 using a different telephone number than that which provides a connection to the alarm receiver 30. Upon a connection being made to the video receiver 32, the call is decoded for the account identifier and the call is routed by the call management system 34 to the same dispatcher station 28 that handled the initial alert. The video signal from the video transmitter panel 20 is then transmitted from the subscriber's premise 36 and a second timer is started, which automatically ends the video after 60 seconds transmission unless the time out is overridden by the dispatcher. The dispatcher can now view the video sent from the subscriber's premise 36 on a video display and evaluate the video signal. The dispatcher has the option of either "going live" and extending the video session for a longer analysis or allowing the video session to end at the default period, preferably 60 seconds. The default period can be extended by the dispatcher at the dispatcher station 28 at any time during the default video session period by selecting an option within the call management software 34 to cause a signal to be transmitted from the dispatch center 26 to the video transmitter panel 20.
 4. The video session ends by the video transmitter panel 20 and the dispatch center 26 each going on-hook, either at the end of the default period or, if the dispatcher has gone live, by the dispatcher station 28 by selecting an option within the call management software 34 to cause a signal to be transmitted from the dispatch center 26 to the video transmitter panel 20.
 5. The line status monitoring circuit in the alarm panel 18 now determines that the telephone line is free. The alarm panel 18 automatically calls the alarm receiver 30 in order to re-establish two way voice communications between the user and the same dispatcher 28 via the alarm panel 18. This allows the dispatcher to relay the information gathered via the video transmission to the user via the two-way speaker phone 14, and/or receive user information via the microphone 16 using the voice feature of the alarm panel 18 without any further intervention or effort on the part of the user.

It will be appreciated by those skilled in the art that changes could be made to the embodiments described above without departing from the broad inventive concept thereof. In particular, variations of the exact sequence for establishing and disestablishing the telephone connections which provide for the single voice grade subscriber telephone line to be used alternately for both voice and continuous video are understood to be within the spirit and scope of the invention. It is understood, therefore, that this invention is not limited to the particular embodiments disclosed, but it is intended to cover modifications within the spirit and scope of the present invention as defined by the appended claims.

I claim:

1. A method of alternately transmitting a voice signal and a continuous video signal over a single voice grade telephone line comprising the steps of:
 establishing a first voice alarm communication connection between a user at a subscriber location and a dispatcher at a dispatch station wherein transmission of voice signals are enabled to be simultaneously transmitted over the single telephone line between the user at the subscriber location and the dispatcher;

disestablishing the first voice alarm communication connection and establishing a second video alarm communication connection wherein a continuous video signal is enabled to be transmitted from the subscriber location to the dispatcher over the single telephone line; and wherein the step of disestablishing the second video alarm communication connection and establishing a third voice alarm communication connection between the subscriber at the subscriber location and the dispatcher, wherein in the third voice alarm communication connection, transmission of voice signals are enabled to be simultaneously transmitted over the single telephone line between the subscriber at the subscriber location and the dispatcher.

2. The method of claim 1, wherein, an identical subscriber account number is used for both the first, second and third communication connections in order that the user is routed to the same dispatcher on the first, second and third communication connections.

3. The method of claim 1, wherein the third voice alarm communication connection is initiated by detecting the on-hook status of the second video alarm communication connection.

4. The method of claim 1, wherein video monitoring is initiated by the dispatcher causing a DTMF signal to be transmitted from the dispatch center to the subscriber location using the first voice alarm communication connection.

5. The method of claim 1, wherein the second video alarm communication connection is established using a different telephone number for the dispatch center than for establishing the first voice alarm communication connection.

6. The method of claim 1, wherein the video signal is transmitted over the second video alarm communication connection at a frame rate of at least four frames per second.

7. The method of claim 1, wherein the second video alarm communication connection is initiated by detecting the on-hook status of the first voice alarm communication connection.

8. A system for alternately transmitting an audio alarm signal and a video alarm signal over a single voice grade telephone line comprising:

an apparatus located at a subscriber location which establishes a first voice alarm communication connection between a user at the subscriber location and a dispatcher at a dispatch station, wherein transmission of voice signals are enabled to be simultaneously transmitted over the single telephone line between the user at the subscriber's premise and the dispatcher; and which disestablishes the first voice alarm communication connection and establishes a second video alarm communication connection, wherein a continuous video signal is transmitted from the subscriber location to the dispatcher over the single telephone line while the second video alarm communication connection remains established; and wherein the apparatus disestablishes the second video alarm communication connection and thereafter establishes a third voice alarm communication connection between the subscriber location and the dispatcher, such that transmission of voice signals are enabled to be simultaneously transmitted between the subscriber location and the dispatcher.

9. The system of claim 8, wherein, an identical subscriber account number is used for both the first, second and third communication connections in order that the user is routed to the same dispatcher on the first, second and third communication connections.

10. The system of claim 8, wherein the third voice alarm communication connection is initiated by the apparatus detecting an on-hook status of the second video alarm communication connection.

11. The system of claim 8, wherein video monitoring is initiated by the dispatcher causing a DTMF signal to be transmitted from the dispatch center to the subscriber location using the first voice alarm communication connection.

12. The system of claim 8, wherein the second video alarm communication connection is established using a different telephone number for the dispatch center than for establishing the first voice alarm communication connection.

13. The system of claim 8, wherein the video signal is transmitted over the second video alarm communication connection at a frame rate of at least four frames per second.

14. The system of claim 8, wherein the second video alarm communication connection is initiated by detecting the on-hook status of the first voice alarm communication connection.

* * * * *